United States Patent
Vandamme

(10) Patent No.: US 9,980,436 B2
(45) Date of Patent: May 29, 2018

(54) ROUND BALER WITH A BRAKE SYSTEM

(71) Applicant: CNH Industrial America LLC, New Holland, PA (US)

(72) Inventor: Dirk A. R. Vandamme, Uitkerke (BE)

(73) Assignee: CNH Industrial America LLC, New Holland, PA (US)

( * ) Notice: Subject to any disclaimer, the term of this patent is extended or adjusted under 35 U.S.C. 154(b) by 511 days.

(21) Appl. No.: 14/606,912

(22) Filed: Jan. 27, 2015

(65) Prior Publication Data
US 2015/0135639 A1 May 21, 2015

Related U.S. Application Data

(62) Division of application No. 13/262,224, filed as application No. PCT/EP2010/053781 on Mar. 23, 2010, now Pat. No. 8,973,339.

(30) Foreign Application Priority Data

Mar. 30, 2009 (BE) .................................. 2009/0193

(51) Int. Cl.
| | |
|---|---|
| B65B 11/00 | (2006.01) |
| B65B 13/00 | (2006.01) |
| B65B 15/00 | (2006.01) |
| B65B 27/00 | (2006.01) |
| A01F 15/07 | (2006.01) |
| B65B 27/12 | (2006.01) |
| B65B 61/06 | (2006.01) |

(52) U.S. Cl.
CPC ........ *A01F 15/0715* (2013.01); *B65B 27/125* (2013.01); *B65B 61/06* (2013.01); *A01F 2015/072* (2013.01); *A01F 2015/076* (2013.01)

(58) Field of Classification Search
CPC ..... B65B 27/125; B65B 61/06; A01D 34/008; A01F 15/0715
USPC ........................................... 53/459, 370, 397
See application file for complete search history.

(56) References Cited

U.S. PATENT DOCUMENTS

| | | | |
|---|---|---|---|
| 3,678,646 A | * | 7/1972 | Clark ...................... B65B 11/04 156/506 |
| 4,597,241 A | | 7/1986 | Clostermeyer |
| 5,231,828 A | * | 8/1993 | Swearingen ........ A01F 15/0715 100/5 |
| 5,243,806 A | | 9/1993 | Jennings et al. |

(Continued)

FOREIGN PATENT DOCUMENTS

EP            1595443 A1    11/2005

*Primary Examiner* — Robert Long
(74) *Attorney, Agent, or Firm* — Peter K. Zacharias; Patrick M. Sheldrake

(57) ABSTRACT

A system for controlling a braking mechanism for a supply roll with wrapping material for a round baler that passes through a first phase wherein, after detection of sufficient crop material in the baling chamber, wrapping material is brought up to the baling chamber and introduced into the baling chamber. The braking mechanism provides a higher braking force during the wrapping operation than the first phase. The wrapping operation is started on detection of movement in the wrapping material. This prevents the braking mechanism from being activated prematurely and leaves sufficient time to deactivate the braking mechanism after the wrapping operation.

5 Claims, 4 Drawing Sheets

(56) References Cited

U.S. PATENT DOCUMENTS

| | | | |
|---|---|---|---|
| 5,433,059 A * | 7/1995 | Kluver | A01F 15/0715 |
| | | | 53/118 |
| 5,448,873 A | 9/1995 | Jennings et al. | |
| 5,956,923 A | 9/1999 | Andros et al. | |
| 6,164,050 A * | 12/2000 | Vande Ryse | A01D 89/004 |
| | | | 100/88 |
| 6,536,337 B2 | 3/2003 | Huchet et al. | |
| 6,644,006 B1 * | 11/2003 | Merritt | A01D 69/00 |
| | | | 56/11.2 |
| 7,181,900 B2 | 2/2007 | Hood et al. | |
| 7,278,251 B2 | 10/2007 | Paillet et al. | |
| 7,513,088 B2 | 4/2009 | Vande Ryse | |
| 7,908,822 B2 | 3/2011 | McClure | |
| 8,122,685 B2 | 2/2012 | Olander | |
| 8,474,222 B2 | 7/2013 | Shoemaker et al. | |
| 8,490,366 B1 | 7/2013 | Hintz | |
| 8,577,563 B2 | 11/2013 | Smith et al. | |
| 8,656,686 B2 * | 2/2014 | Smith | A01F 15/0715 |
| | | | 493/370 |
| 8,973,339 B2 * | 3/2015 | Vandamme | A01F 15/0715 |
| | | | 53/397 |
| 2007/0157556 A1 | 7/2007 | Feraboli et al. | |
| 2011/0179750 A1 * | 7/2011 | Smith | A01F 15/0715 |
| | | | 53/399 |
| 2012/0233962 A1 * | 9/2012 | Bennett | A01F 15/0715 |
| | | | 53/203 |
| 2013/0036921 A1 * | 2/2013 | Horstmann | A01F 15/0705 |
| | | | 100/5 |
| 2013/0152513 A1 | 6/2013 | Havens et al. | |
| 2014/0260090 A1 | 9/2014 | Smith et al. | |

* cited by examiner

ROUND BALER WITH A BRAKE SYSTEM

This application is a divisional of U.S. patent application Ser. No. 13/262,224, entitled "METHOD FOR OPERATING A BRAKE SYSTEM AND A ROUND BALER WITH A BRAKE SYSTEM", filed Dec. 13, 2011. This application further claims priority of International Application Serial No. PCT/EP2010/053781 filed on Mar. 23, 2010 which claims priority to Belgium Application BE2009/0193 filed Mar. 30, 2009, each of which is incorporated herein by reference in its entirety.

TECHNICAL FIELD

This invention relates to a machine for making cylindrical bales, commonly referred to as a round baler. More particularly, the invention is concerned with a method for braking the wrapping material, such as a film or a net and a brake system for wrapping material that is applied to the cylindrical package of crop material formed inside the round baler.

BACKGROUND ART

Round balers generally have a bale forming chamber defined by a periphery apron comprising an array of side-by-side belts, transverse slats trained on chains, a plurality of rolls or a combination of these various elements, e.g. rolls and belts. Crop material such as hay or straw or another crop is picked up from the ground as the baler traverses the field and fed into a fixed or variable chamber where it is accumulated and compressed to form a cylindrical package of crop material. The formed package, while in its compacted condition inside the chamber, is wrapped with net, plastic film, twine or the like, to produce a completed round bale which is then ejected from the chamber onto the ground for subsequent handling.

The device for wrapping net or plastic film around the crop material in the baling chamber commonly comprises a supply roll of wrapping material, a mechanism for dispensing wrapping material from the supply roll to the baling chamber and a cutting mechanism for severing the wrapping material after a suitable length has been wound about the bale.

In order to preclude uncontrolled unwinding of the net or film from the roll in between wrapping operations, a brake mechanism is mounted to the supply roll. The brake mechanism can also be used to tension the wrapping material between the supply roll and the baling chamber during the actual wrapping operation.

In DE-U-84.01.166, the supply roll rests on the bottom of a supply container and braking action is provided by the friction of the roll against the bottom and wall of the supply container. However, the friction force is largely dependent on the properties of the container surface and the wrapping material on the one hand, and on the diminishing weight of the roll on the other hand. Hence, the resulting force on the dispensed net is subject to large variations.

The wrapping device shown in U.S. Pat. No. 5,448,873 comprises a roll which is supported on a transverse shaft and a brake element which is in state of rest biased by a spring against the periphery of the roll. Once again, the friction forces here are largely dependent on the surface properties of the wrapping material. Furthermore, the stretching forces tend to diminish as the diameter of the roll decreases and the bias spring is relaxed.

EP 0 807 380 of the applicant overcomes the disadvantages of these earlier proposals and is believed to represent the closest prior art to the present invention. The wrapping device of this patent comprises a supply roll supported on a transverse support shaft mounted for rotation between the side walls of the main frame. An device, constructed as a so-called duckbill, receives wrapping material from the supply roll and feeds it to the periphery of a completed bale package at the commencement of a wrapping operation. A cutter severs the wrapping material after a suitable length has been wrapped about the periphery of the bale.

In order to maintain a desired tension in the net or wrapping material as it is being unwound from the supply roll, a brake drum is engaged by a brake shoe secured for rotation with the support shaft. An improvement taught by EP 0807380 is to vary the force by which said brake shoe is pressed against the brake drum in dependence upon the amount of wrapping material remaining on the supply roll.

The operation of the wrapping device of EP 0 807 380 will now be described with reference to the accompanying FIGS. 1, 2 and 3 which correspond to FIGS. 4, 5 and 6 of the latter patent, respectively. These drawings show side views of the wrapping device at three different stages in the operating cycle. The drawings will be described below only to the extent necessary for an understanding of the present invention. They are however described in greater detail in the specification of EP 0 807 380, which, in the interest of brevity, is incorporated herein by reference in its entirety.

In FIGS. 1 to 3, only part of the baling chamber 10 can be seen in the drawings and it is located to the right of drawings. The wrapping material 12 is wound on a supply roll 14 and the braking mechanism 16 acts on the supply roll 14 to control the web tension while the bale is being wrapped. In the drawings, the braking mechanism 16 is shown in solid lines whereas the parts of the baler not associated with the braking mechanism are shown in broken lines.

FIGS. 1 and 2 show the wrapping mechanism as a bale is being wound. A supply roll 14 is mounted on a transverse support shaft 15, rotatably supported between the side walls of the main frame of the round baler. Wrapping material 12 drawn from the supply roll 14 passes through a duckbill 18 and cutter 20 into the baling chamber 10. The correct tension in the wrapping material 12 is maintained by controlling the braking of the supply roll by the braking mechanism 16, which will now be described in greater detail.

The braking mechanism 16 comprises a brake shoe 22 fitted to a lever 24 biased counter-clockwise by a spring 26 to make contact with a brake drum 23 that is connected with the supply roll, for example via the transverse support shaft 15 for the supply roll 14. A separate actuating lever 28 pivoted about the fulcrum of the lever 24 is biased in state of rest by a spring 30 to increase the braking force. The opposite end of the spring 30 is anchored to a lever 32 connected to a follower 34 with a follower roller 35 such that its position varies with the diameter of the supply roll 14. This can readily be seen from a comparison of FIGS. 1 and 2. In this way, as the supply roll 14 diameter reduces, so does the force applied by the spring 30 and the braking force applied by the brake shoe 22. Consequently, the tension on the wrapping material 12 remains under substantially the same tension as the wrapping material 12 is unwound form the supply roll 14 and its diameter reduces.

A manually operated lever 40 is provided for rotating the lever 24 clockwise to release the brake entirely when the supply roll 14 is to be changed.

Once the desired length of wrapping material 12 has been wound about the formed bale, it is cut using the cutter 20. Following this, the formed bale is discharged from the baling chamber 10 and more crop is introduced into the baling chamber to create a fresh bale.

Once the baling chamber 10 is full, a signal from a suitable sensor is generated to commence a wrapping operation. E.g. the signal is used by a controller of the baler to operate a hydraulic actuator 50 which is connected to the duckbill 18 to advance it from a state of rest that corresponds approximately with the position shown in FIG. 1 or 2 to a position that corresponds approximately with the position shown in FIG. 3 that is to say towards an opening in the baling chamber 10 where the web is picked up by a stripper roller 52 and pressed against the outer surface of the bale. The duckbill 18 is also connected by a rod 54 to the brake actuating lever 28 such that by the time that the wrapping material 12 is engaged by the stripper roller 52 and dragged into the baling chamber 10, the braking force will have been released to allow free movement of the wrapping material 12. The duckbill 18 then retracts over a certain distance to the position shown in FIGS. 1 and 2, so that the braking mechanism 16 exerts a braking force to maintain the desired tension in the wrapping material 12. The duckbill 18 subsequently returns completely to its state of rest whilst the braking mechanism 16 continues to brake and the cutter 20 cuts the wrapping material 12 between the supply roll 14 and the baling chamber 10.

A problem is encountered with the wrapping mechanism of EP 0 807 380 if the wrapping material 12 is dragged into the baling chamber by the stripper roll 52 before the duckbill 18 has reached the position in which the braking mechanism 16 is sufficiently released. The distance between the end of the duck bill 18 and the cutter 20 in FIGS. 1 and 2 is, say, about 10 cm and, as a result, a flap wrapping material 12 of this length is assumed to protrude from the end of the duckbill 18 at the commencement of the wrapping operation. However, under certain circumstances, such as when the supply roll 14 is replaced by a new the supply roll 14 with wrapping material 12 with different properties or when wrapping material is irregularly cut as a result of wear and tear in the cutting installation or local quality problems in the wrapping material, the length of the flap of wrapping material 12 projecting from the end of the duckbill 18 may change to, say, 20 cm or more, or long tatters may form of 20 cm or more for example. In such cases, the wrapping material 12 will be gripped by the stripper roll 52 whilst the braking mechanism 16 is still applied and this results in tearing of the wrapping material.

DISCLOSURE OF INVENTION

As a result, the goal of this invention is to provide a method for braking wrapping material, and a round baler with a brake system for wrapping material that offers a solution for the above problem areas.

According to a first aspect of this invention, a method is provided for controlling a braking mechanism for a supply roll with wrapping material for a round baler that passes through the following phases during its operating cycle:

during a first phase, after detection of sufficient crop material in the baling chamber, wrapping material is brought up to the baling chamber and introduced into the baling chamber;

during a subsequent second phase the actual wrapping operation is carried out, whereby the wrapping material is fed into the baling chamber and wrapped around the bale;

during a subsequent third phase a cutting operation is carried out, whereby the wrapping material is cut between the supply roll and the baling chamber;

during a subsequent fourth phase the wrapped bale is ejected out of the baling chamber; and during a subsequent fifth phase the crop material is fed into the baling chamber, whereby the braking mechanism is controlled to provide a higher braking force during the second phase than during the first phase; characterised in that the second phase is started after detection of movement of the wrapping material.

In this invention, increasing the braking force is not linked to the movement of the dispensing mechanism to bring the wrapping material up to the baling chamber and to feed it into the baling chamber, e.g. the duckbill. As a result, the braking force can be lowered during any phase of the cycle other than the second phase. This means that the braking force will certainly be reduced on time to start the first phase and the braking force is not increased until the wrapping material has effectively been fed into the baling chamber. This also sufficiently reduces the risk that the braking force is increased too much before the wrapping material has been fed sufficiently into the baling chamber.

In one embodiment of the invention, the second phase is started after completion of a predetermined time period that is started after detection of movement of the wrapping material.

In a subsequent embodiment of the invention, the second phase is started after detection of a predetermined displacement of the wrapping material after detection of movement of the wrapping material.

In a subsequent embodiment of the invention, the second phase is started immediately after detection of movement of the wrapping material.

As a result of this, for example, it becomes possible to set the most suitable moment to increase the braking force depending on the type of wrapping material, the configuration of the baler, wear and tear in the cutting installation.

In a subsequent embodiment of the invention, the braking mechanism is controlled at least during the second phase to change its braking force in function of the diameter of the supply roll.

In a subsequent embodiment of the invention, the braking mechanism is controlled at least during the second phase to change its braking force in function of the tension in the wrapping material.

This makes it possible to modulate the braking force depending on the type of wrapping material or the configuration of the baler. This also has the advantage that the invention's method can be applied to an existing baler with a minimum number of changes to the existing braking mechanism.

According to a second aspect of the invention a round baler is provided to execute the method in accordance with the first aspect of the invention, which comprises:

a baling chamber (10);

a sensor to detect when there is sufficient crop material in the baling chamber (10);

a supply roll (14) with wrapping material (12, 112);

a device to bring the wrapping material (12, 112) to the baling chamber (10) and to feed it into the baling chamber (10);

a cutter (20) to cut the wrapping material (12, 112);

a braking mechanism (36, 136) for the supply roll (14);

a sensor for the detection of movement of the wrapping material (12, 112), characterised in that the braking mechanism (36, 136) has a separate actuator (80, 180) that can be controlled to determine the braking force.

The release and activation of the braking mechanism is not linked to the movement of the installation to transport the wrapping material up to the baling chamber and feed it into the baling chamber, such as for example the duckbill. Instead, a separate actuator, for example an electric, hydraulic or pneumatic actuator ensures that the braking mechanism can already be released long before the duckbill starts moving and that the braking force is not increased until the wrapping material has certainly been fed into the baling chamber.

In a preferred embodiment of the invention, the sensor for the detection of the movement of the wrapping material is executed as a rotation sensor that is arranged on a roll that comes into contact with the wrapping material.

This makes it possible to enable movement detection of the wrapping material with simple resources that in many cases are already present in existing balers to register the number of times the wrapping material is wrapped around the bale.

In other embodiment of the invention, the baler further comprises a controller for the control of the braking mechanism. In a preferred embodiment of the invention, the operator can enter or select a predetermined braking force in the controller for the second phase.

This allows the operator, for example, to adapt the braking force to the type of wrapping material.

BRIEF DESCRIPTION OF DRAWINGS

The invention will now be described further, by way of example, with reference to the accompanying drawings, in which.

MODE(S) FOR CARRYING OUT THE INVENTION

Figure 4:
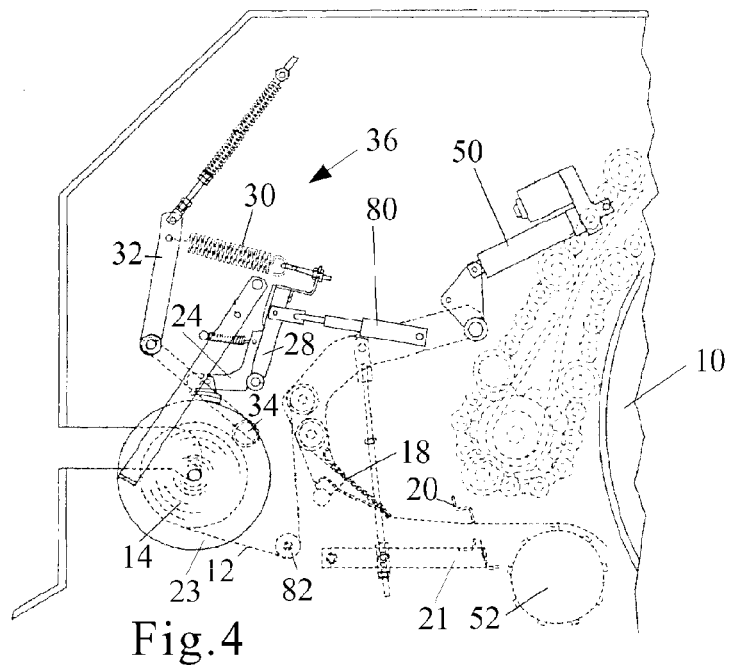
FIGS. 4 and 5 show a first embodiment of the invention constructed as a modification of the wrapping device shown in FIGS. 1 to 3, the two figures corresponding to FIGS. 1 and 3, respectively.
Figure 5:
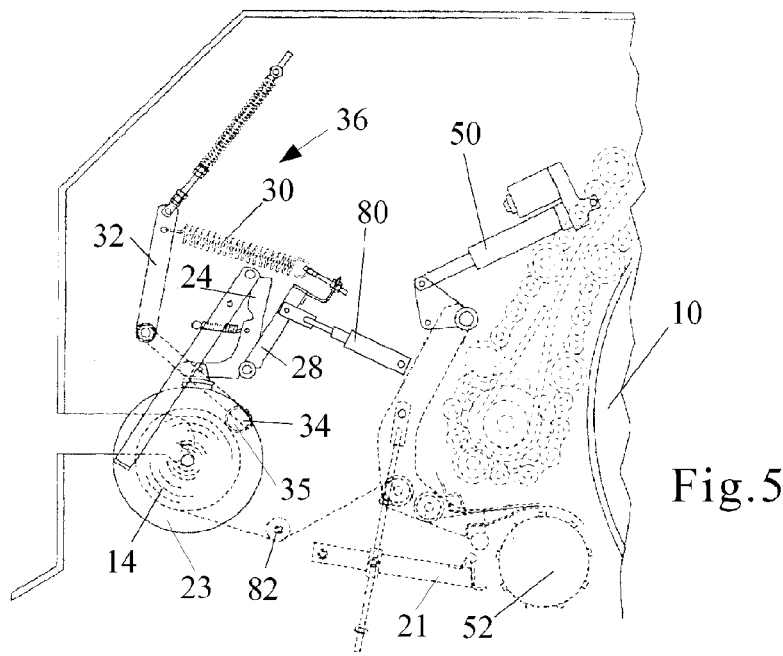
Figure 6:
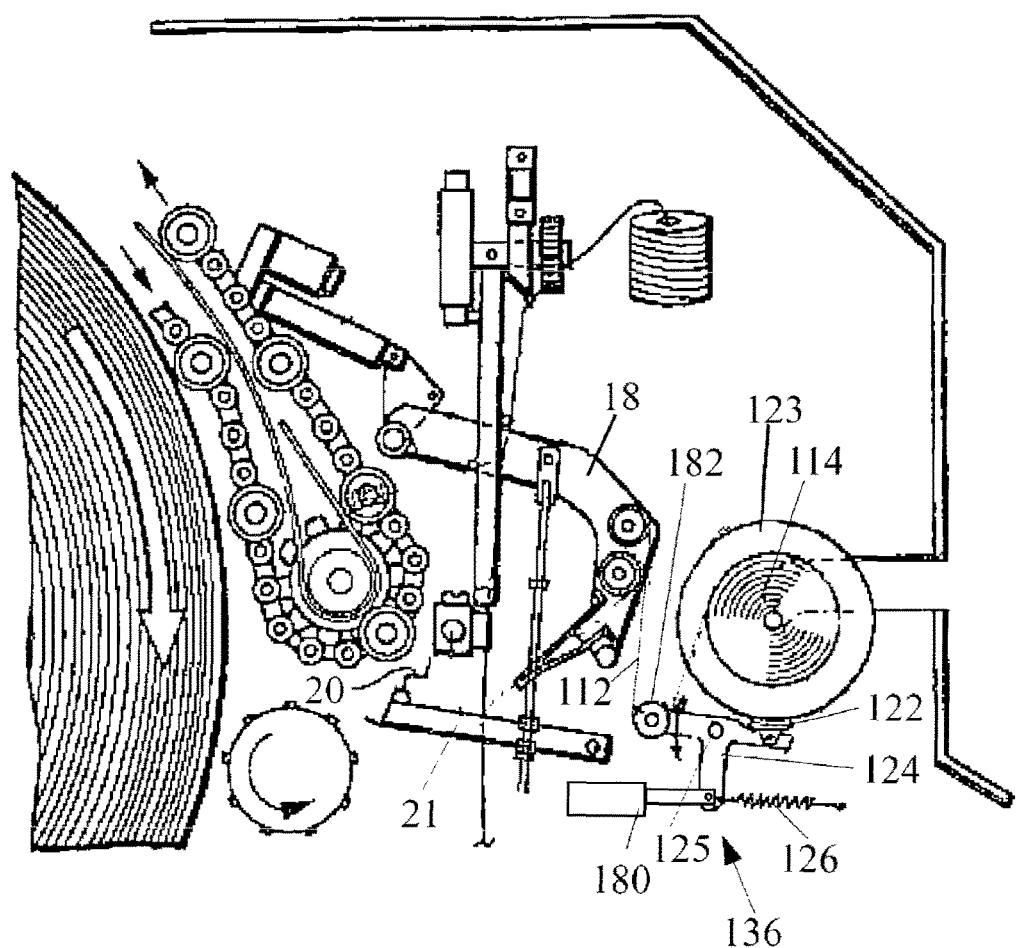
FIG. 6 is side view of a baler fitted with a wrapping device of a second embodiment of the invention.

To avoid unnecessary repetition, components in FIGS. 4 to 6 serving the same function as in FIGS. 4 to 6 have been allocated the same reference numerals and will not be described in detail. The description of the embodiments of the invention will instead focus on the improvements introduced by this invention.

Figure 1:
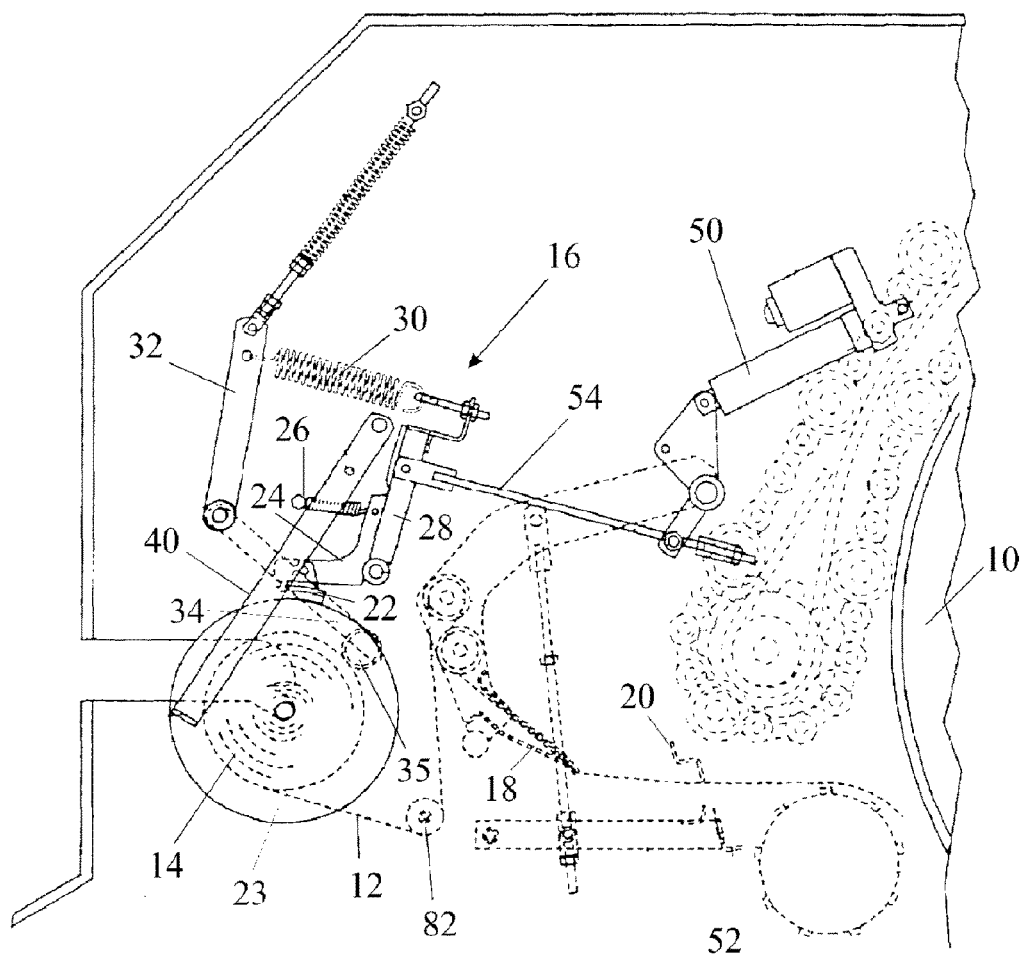
FIGS. 1 to 3, as already described, show a wrapping device known from EP 0 807 380 at three different stages during a wrapping operation.
Figure 2:
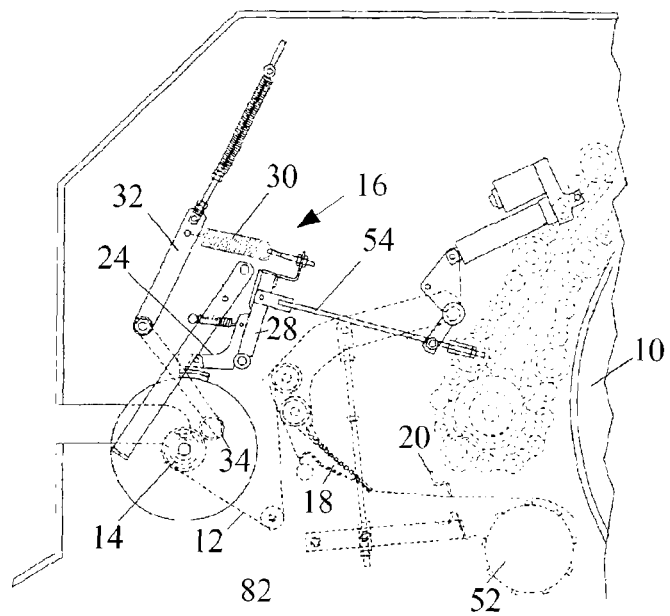
Figure 3:
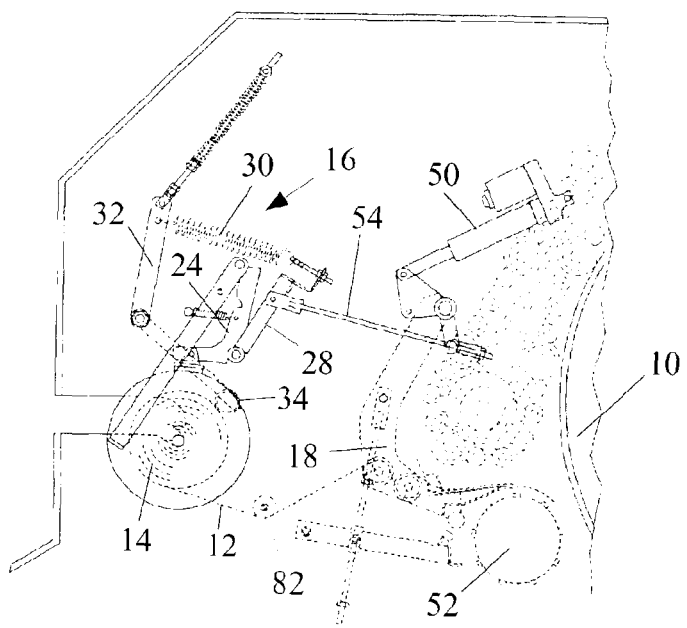

The rod 54 connecting the duckbill 18 to the operating lever 28 in FIGS. 1 to 3, is replaced in the first embodiment of the invention, shown in FIGS. 4 and 5 by an actuator 80. The actuator 80 is shown as a hydraulic actuator but it may according to an alternative embodiment be executes as an electrical or pneumatic actuator.

When a signal is received to commence a wrapping operation, the actuator 80 is operated e.g. by a control system to move to the position shown in FIG. 5. In this position of the actuator 80, only the weak spring 26 acts on the lever 24 and a minimal braking force is applied by the brake shoe on the brake drum 23 and as a result to the supply roll 14. In one embodiment of the invention, the actuator 80 is able to completely disengage the braking mechanism 36. In a variant embodiment of the invention, it suffices if the actuator 80 can sufficiently reduce the braking force as illustrated in FIG. 5 for example.

Thereafter, movement of the wrapping material 12 is monitored by a counter or other rotation sensor fitted to the follower roller 35 or to a guide roller, for example the roller 82, with which the wrapping material 12 is in contact as it passes along its path from the supply roll 14 to the baling chamber 10. It is clear that any other sensor that is able to detect movement in the wrapping material qualifies for variant embodiments of the invention, such as for example optical, acoustic, magnetic . . . displacement sensors. When movement of the wrapping material is detected, the braking mechanism 36 is re-applied by returning the operating lever 28 to the position shown in FIG. 4, and functions in the same manner as in the prior art to vary the web tension as a function of supply roll diameter. In one embodiment of the invention, the braking mechanism 36 is activated as soon as movement is detected in the wrapping material 12. In another embodiment of the invention, activation of the braking mechanism 36 can be delayed, for example, during a predetermined time period or during a half, one, two, three, . . . , ten or another predetermined number of revolutions or a fraction of revolutions of the rotation sensor that detects the movement of the wrapping material 12, which corresponds with a certain movement of the wrapping material. The return of the operating lever 28 to its position in FIG. 4, may be performed gradually in order to avoid a sudden variation in the tension of wrapping material 12.

After a predetermined number of revolutions of the wrapping material 12 around the bale, or when a certain length of wrapping material 12 has been rolled off the supply roll 14, which for example corresponds with a predetermined number of revolutions of the rotation sensor, the wrapping operation is completed and the wrapping material is then cut by the cutter 20. In the embodiment shown in FIG. 4, this can be controlled by the hydraulic actuator 50 in such a way that the duckbill 18 rotates a little further clockwise so that a pivotable cutting block 21 presses the wrapping material 12 against the cutter 20 to cut it. During the cutting operation, the braking mechanism 36 remains activated. It is also possible to increase the braking force of the braking mechanism 36 during the cutting operation by means of controlling the actuator 80, in order to achieve optimum performance of the cutter 20 depending on the type of wrapping material 12. On completion of the cutting operation, the duckbill 18 returns to its position as shown in FIG. 4, so that the pivotable cutting block also moves back anticlockwise to its position as shown in FIG. 4. It is clear that alternative versions of the invention are possible in which there is also a separately controlled actuator for the cutting direction and/or the pivotable cutting block.

The wrapped bale is subsequently ejected and after that crop material can once again be fed into the baling chamber so start the next bale. Preferably the braking mechanism 36 remains activated here to prevent the wrapping material 12 starts to unroll from the supply roll 14 as a result of vibrations for example, which could lead to damage or irregularities in the wrapping material 12, which in turn could lead to it not being possible to introduce the wrapping material 12 into the baling chamber 10 correctly. However it is possible to reduce the braking force to a certain minimum for this, so that on starting the following wrapping operation the braking force only has to be reduced slightly or practically not at all when the duckbill moves the wrapping material 12 to the baling chamber 10 to feed it into the baling chamber 10.

In a further embodiment of the invention shown in FIG. 6, a brake shoe 122 is mounted on a T-shaped lever 124 pivoted around a rotary shaft 125 in the centre of the cross-piece of the "T". The opposite end of the cross-piece carries a roller 182 over which the wrapping material 112 is guided. As tension in the wrapping material 12 increases, the lever 124 pivots clockwise and reduces the braking force applied to the brake drum 123 en as a result to supply roll 114. Conversely, if the wrapping material 112 is too slack the lever 124 is rotated by a spring 126 anticlockwise to increase the braking force on to the brake drum 123 and as a result on the supply roll 114. In this way, the tension of the wrapping material 112 is self-regulating.

To implement this invention in a braking mechanism 136 of the type shown in FIG. 6, an actuator 180 is connected to the limb of the lever 124 to which the spring 126 is attached. The actuator 180 is operated by a control system in the same manner as described for the embodiment shown in FIGS. 4 and 5, namely it is retracted to disengage the braking mechanism 136 or reduce the braking force from the braking mechanism 136 to a predetermined minimum at the commencement of a wrapping operation and it is extended back to the illustrated position in FIG. 6 to reengage the braking mechanism 136 once movement of wrapping material 112 has been sensed. During the wrapping operation, this position is kept and it is possible to even increase the braking force during the cutting operation. After the cutting operation, the bale is ejected and then new crop material is introduced into in the baling chamber 10. Preferably the braking mechanism 136 remains activated at least at a predetermined minimum braking force to prevent the supply roll 14 from starting to unroll on its own.

In one embodiment of the invention, the operator can enter the predetermined values for the braking force during the introduction of the wrapping material in the baling chamber, the wrapping operation, the cutting operation, the ejection of the bale and/or the introduction of crop material in the baling chamber respectively in a controller of the baler that then controls the actuator 80, 180 of the braking mechanism 36, 136 appropriately to obtain the braking force entered.

It is clear that the method of the invention can be applied in other braking mechanisms that have not been shown for a supply roll 14 with wrapping material 12 for a baler or in combination with other means for introducing the wrapping material in the baling chamber 10 than the duckbill 18 in the versions shown.

Naturally the invention shown in the conclusions is not limited to the versions described in the examples or shown in the figures, but can also comprise combinations and variants that fall under the scope of protection of the conclusions.

What is claimed is:

1. A round baler comprising:
    a baling chamber;
    a first sensor configured to detect crop material in the baling chamber;
    a feeding device having a first actuator, the feeding device configured for dispensing wrapping material from a supply roll into the baling chamber;
    a cutter to cut the wrapping material;
    a braking mechanism for the supply roll;
    a second sensor configured for detecting the movement of the wrapping material; and
    wherein the braking mechanism comprises a lever and a biasing member connected to the lever, the biasing member configured for increasing braking force and a second actuator connected to the lever, the second actuator configured to move the lever to disengage the braking mechanism or reduce the braking force from the braking mechanism at the commencement of a wrapping operation and reengage the braking mechanism once movement of wrapping material has been sensed, wherein the second actuator is separately controllable from the first actuator, the braking mechanism-configured to provide a higher braking force during a second phase of feeding material in the chamber than during a first phase of moving material toward the chamber wherein the actuator is controlled to provide the higher braking force after detection of movement of the wrapping material by the second sensor.

2. A round baler according to claim 1, wherein the second sensor for the detection of the movement of the wrapping material is a rotation sensor arranged on a roll that comes into contact with the wrapping material.

3. A round baler according to claim 1, further comprising a controller connected to the second sensor and the second actuator for the control of the braking mechanism, wherein during the second phase wrapping material is fed into the baling chamber and wrapped around the bale and the controller controls the actuator to provide the higher braking force during the second phase than during the first phase.

4. A round baler according to claim 1, wherein at least for the second phase the operator can input or select a predetermined braking force in the controller.

5. A round baler comprising:
    a baling chamber;
    a first sensor configured to detect crop material in the baling chamber;
    a feeding device having a first actuator, the feeding device configured for dispensing wrapping material from a supply roll into the baling chamber;
    a cutter to cut the wrapping material;
    a braking mechanism for the supply roll;
    a second sensor configured for detecting the movement of the wrapping material; and
    wherein the braking mechanism has a second actuator separately controllable from the first actuator, the braking mechanism-configured to provide a higher braking force during a second phase of feeding material in the chamber than during a first phase of moving material toward the chamber wherein the actuator is controlled to provide the higher braking force after detection of movement of the wrapping material by the second sensor;
    wherein the braking mechanism further comprises a brake shoe mounted to a lever, the lever having a connected roller positioned to contact the wrapping material, a spring connected to the lever and configured for increasing braking force and the second actuator is connected to the lever, the second actuator configured to move the lever to disengage the braking mechanism or reduce the braking force from the braking mechanism at the commencement of a wrapping operation and reengage the braking mechanism once movement of wrapping material has been sensed.

* * * * *